United States Patent Office

3,726,691
Patented Apr. 10, 1973

3,726,691
PROCESS FOR PRODUCING POLYGLYCEROL ESTER FLUFFY FROSTING MIXES
Paul Seiden, Cincinnati, Ohio, assignor to The Procter & Gamble Company, Cincinnati, Ohio
No Drawing. Filed Mar. 25, 1971, Ser. No. 128,157
Int. Cl. A23g 3/00
U.S. Cl. 99—139                        8 Claims

ABSTRACT OF THE DISCLOSURE

Dry prepared fluffy frosting mixes containing polyglycerol esters are produced by predispersing the polyglycerol esters in a hot aqueous sugar solution, cooling the resultant solution, blending the solution with dry sugar, grinding the resultant blend, and mixing the resultant blend with additional ingredients such as flavorings, salt, and thickeners. The dry mix can be made into a fluffy frosting by adding water and whipping the water and the mix together.

BACKGROUND OF THE INVENTION

The invention relates to edible toppings known as fluffy frostings. Fluffy frostings are generally shortening free, aqueous, compositions which are used as toppings on cakes, cupcakes, and other desserts. Fluffy frostings are normally light and highly aerated. They have a unique and desirable mouth feel and eating quality provided by the high level of aeration and skillful formulation and therefore these products are highly favored by consumers as a topping or filling for baked items, ice cream, pudding, confectionaries, and the like.

Fluffy frostings conventionally consist predominantly of sugar and water and also must contain an aerating agent. As prepared in the home, fluffy frostings almost always utilize egg white as the aerating agent. Dry mixes which can be whipped into a fluffy frosting upon the addition of water are commercially available. These products generally utilize egg albumen or a similar protein source as the aerating agent and they also contain a stabilizer for the foam which is usually a gum-type material such as algin, gelatin, or a cellulose derivative such as carboxymethyl cellulose.

A primary disadvantage possessed by conventional fluffy frostings is their instability over a period of time. A further disadvantage possessed by commercially available fluffy frosting mixes is the fact that the protein aerating agent is generally a very expensive ingredient and is susceptible to microbiological attack. These disadvantages were overcome by using polyglycerol esters as the aerating agent in fluffy frosting mixes. A dry mix based on polyglycerol esters per se is not desirable since the specific polyglycerol esters suitable or use herein exist in the form of hard brittle waxy solids. Dry granular ingredients are blended within the polyglycerol esters to provide a dry prepared mix. However, such dry prepared mixes do not provide sufficient dispersion of the polyglycerol esters. Such dry mixes do not exhibit a desirable degree of functionality.

One method for obtaining sufficient dispersion of the polyglycerol esters is to predisperse the polyglycerol esters in an aliphatic polyhydric alcohol carrier as described in commonly assigned, copending application, Ser. No. 711,862, filed Mar. 11, 1968. U.S. Pat. 3,230,090, patented Jan. 18, 1966, shows a method for rendering polyglycerol esters dispersible in shortening compositions by incorporating a coupling agent in the shortening. These references show only how to disperse polyglycerol esters in polyol carriers.

Accordingly it is an object of this invention to provide a process by which highly functional dry prepared fluffy frosting mixes containing polyglycerol esters can be produced. A further object of this invention is to provide a method by which uniform dispersion of polyglycerol esters can be achieved in a dry prepared fluffy frosting mix. Yet another object of this invention is to provide a method by which uniform dispersion of polyglycerol esters can be achieved without the necessity of pre-dispersing the polyglycerol esters in a polyol carrier.

SUMMARY OF THE INVENTION

Dry fluffy frosting mixes are prepared by first pre-dispersing polyglycerol esters in a hot aqueous sugar solution comprised of water, and preferably sucrose, dextrose, or mixtures of sucrose and dextrose. The polyglycerol ester-sugar solution blend is agitated and cooled to below 120° F., preferably to room temperature. The cooled blend is then mixed with dry sugar in a ratio of from 1 to 5 to 1 to 50, preferably from 1 to 7 to 1 to 11. The above-described mixture is then ground, preferably in a pin mill, and blended with additional ingredients such as flavorings, salt, and thickeners. The resulting dry fluffy frosting mix is highly functional due to the fine dispersion of the polyglycerol esters and produces highly aerated fluffy frostings when it is mixed with water and whipped.

DETAILED DESCRIPTION OF THE INVENTION

The characterizing ingredient in the fluffy frosting compositions of the present invention comprises certain polyglycerol esters of fatty acids. These materials are partial polyglycerol esters containing on the average from about 2 to about 12 glycerol units and averaging from 2 to about 5 long chain, saturated fatty acid groups per molecule. Polyglycerol essentially is a polymer which is formed by the dehydration of glycerin and is well known in the art. See, for example, the above-mentioned copending application.

Polyglycerols can be esterified by the reaction with fatty acids. Esterification can take place at any or all of the hydroxyl groups but generally occurs predominantly at the secondary hydroxyl positions, leaving the terminal hydroxyl group unaffected. Depending upon the reaction conditions and the ratio of fatty acid to polyglycerol, the number of secondary hydroxyl groups which are esterified varies. By controlling the balance of esterified to unesterified hydroxyl groups, the lipophilic-hydrophilic balance of the polyglycerol ester can be varied. With an increasing number of esterified hydroxyl groups, the polyglycerol esters become progressively more lipophilic and progressively less hydrophilic. This lipophilic-hydrophilic balance in the polyglycerol ester is important in preparing polyglycerol esters for use as a fluffy frosting ingredient. Generally, sufficient lipophilic properties are imparted to the polyglycerol ester by the fatty acid esterification of a single hydroxyl group. However, to maintain sufficient hydrophilic properties in the molecule, the polyglycerol ester preferably should not contain an average of more than about 5 fatty acid radicals. Preferably, the polyglycerol ester will contain about 3 fatty acid radicals. In this same regard, the polyglycerol ester used in the dry prepared fluffy frosting mixes of this invention can contain on the average from about 2 to about 12 glycerol units, and preferably contains on the average about 10 glycerol units.

The fatty acid groups can be derived from suitable naturally-occurring or synthetic fatty acids and can be saturated or unsaturated, but are preferably substantially saturated. Examples of these fatty acids are lauric, myristic, palmitic, stearic, arachidic, behenic, and lignoceric.

Polyglycerol which has been esterified with a mixture of fatty acids can also be used in preparing fluffy frosting mixes. A possible mixture of fatty acids comprises (on a weight percent basis) behenic 0–35%, stearic 30%–75%, palmitic 10%–50%, and myristic and lauric 0%–10%. The polyglycerol ester of mixed fatty acids can comprise mixed fatty acid radicals on each individual polyglycerol molecule (so that all the polyglycerol molecules are substantially the same) or can comprise the same fatty acid radical on each individual polyglycerol ester molecule (so that all the individual polyglycerol molecules are not the same).

In actual practice polyglycerol esters usually contain a mixture of molecules that average the specified number of glycerol units and fatty acid ester groups per glycerol unit; individual molecules within the mixture can vary from the average. For example, decaglycerol tribehenate contains an average of about 10 glycerol units per molecule and an average of about 3 fatty acid ester (behenoyl) groups per molecule, while some individual molecules could contain 8, 9, 11, or 12 glycerol units and 2 or 4 fatty acid ester groups. Such mixtures are within the scope of this invention.

The polyglycerol esters can be prepared by conventional direct or interesterification techniques. Suitable methods of forming the specified polyglycerol esters are disclosed by Harris, U.S. Pats. 2,022,766 and 2,023,388, both granted Dec. 3, 1935, and in British Pat. 1,025,265, Apr. 6, 1966. See also Bakers Digest, 37, #5, pp. 72–75 (October 1963).

This invention provides highly functional dry prepared fluffy frosting mixes based on the above-described polyglycerol esters. Polyglycerol esters are hard brittle waxy solids and are therefore difficult to disperse evenly in a dry prepared mix. Such mixes do not exhibit a desirable degree of functionality unless the polyglycerol esters are very finely dispersed throughout the mixes.

In the process of the present invention, polyglycerol esters are melted and blended with a hot aqueous sugar solution which is no more than about 20% to 50% water by weight of the total solution. It is important to keep the amount of water at a minimum so that the final dry mix will be free-flowing. If too much moisture is present the final dry mix will be undesirably sticky. The sugar can be a crystalline type such as sucrose, a non-crystal-tending sugar such as dextrose, or preferably, a mixture of the two types. The ratio of melted polyglycerol esters to hot concentrated sugar solution can be varied from about 1:1 to about 1:5, but preferably is from about 1:2 to 1:4. If the ratio is less than about 1:1, sufficient dispersion of the polyglycerol esters cannot be achieved, and if the ratio is more than about 1:5, too much water is present to form a free-flowing dry mix.

The blend must then be agitated and cooled to below 120° F., preferably to room temperature. The cooling and agitation are necessary to maintain the very fine dispersion of the polyglycerol esters because the polyglycerol esters tend to separate from the sugar solution at higher temperatures. The cooled blend is then ground, preferably in a pin mill. The grinding substantially increases the whippability of the frosting mix. The cooled polyglycerol ester-sugar solution blend is then mixed with dry sugar, preferably with a mixture of granular sugar and powdered sugar. The preferred ratio of granular sugar to powdered sugar is from about 2:1 to about 1:2. The use of these two kinds of sugar prevents lump formation because the granular sugar acts as an abrasive to break down sugar lumps especially if vigorous agitation is applied. The ratio of polyglycerol ester-sugar solution blend to dry sugar can be varied from about 1:5 to about 1:50 in order to vary the polyglycerol ester concentration in the dry frosting mix. The preferred ratio of polyglycerol ester-sugar solution blend to dry sugar is from about 1:7 to about 1:11. If the ratio is more than about 1:5, then there will be too much polyglycerol ester in the mix, and if the ratio is less than about 1:50, there will be too little polyglycerol ester in the mix. The above described mixture is then blended with the remaining frosting ingredients, which may include flavorings, salt, and thickeners, to yield a dry prepared fluffy frosting mix.

The sugar included in the dry prepared mixes made by the process of this invention can be materials such as sucrose, dextrose, lactose, glucose, galactose, fructose, and the like or mixtures thereof. Sucrose and/or dextrose are preferred sweetening agents. A minor amount of salt can be added and any conventional flavor material can also be added to the dry prepared fluffy frosting mixes.

Conventional aerating agents for fluffy frostings, such as egg white, can be added to the dry prepared mixes of this invention but they are not required. Conventional thickening agents for fluffy frostings, such as carrageenan, agar, guar, carboxymethyl cellulose, starch, or gelatin, can also be added to the dry prepared mixes of this invention to affect the heat stability of the finished frosting. In the particular polyglycerol ester-based dry prepared fluffy frosting mixes of the present invention, it is preferable to omit shortening from the formulation. Shortening or other fat, particularly in liquid form, can decrease the aerating properties of the polyglycerol ester-based dry prepared fluffy frosting mixes of the present invention.

When fluffy frostings are prepared from the dry mixes of this invention, they require only the addition of hot water and beating in a bowl to yield within a few minutes a highly aerated, aqueous fluffy frosting with a smooth viscous texture. For example, mixing in a household electric mixer for a period of less than ten minutes is sufficient to whip the composition into an aerated fluffy frosting. The polyglycerol ester fluffy frosting compositions tend to reach minimum density faster than do conventional fluffy frostings when mixed in a household electric mixer. Additional mixing, e.g., for 1 to 5 minutes beyond this point, is desirable to assure uniformity.

The aerated, aqueous, fluffy frostings prepared from the dry mixes of this invention have a smooth viscous texture at least comparable to commercial products and an aerated structure superior thereto in terms of density and stability. Frostings of increased stability and acceptable from every standpoint, particularly in respect to their chiffon-like or fluffy mouth-feel, are provided by the invention.

The dry prepared fluffy frosting mixes disclosed herein are economical to use and have a particular advantage in this respect in that substantially more volume of frosting can be obtained from a given weight of ingredients than with conventional fluffy frostings because of the high aeration properties and corresponding low density of the frostings of this invention.

The frostings of the invention are more aerated than conventional fluffy frostings as indicated by their density which is generally less than about 0.3 gm./cc. Because of the high level of air which they contain, the frostings have a very desirable glossy-type appearance. The icings do not have a tendency to leak, i.e. lose liquid upon storage. Further, the frostings do not change in appearance or eating quality upon storage.

The following example is meant only to illustrate the invention and not to limit it in any way.

Example 200 grams of decaglycerol ester made from a mixture of fatty acids which was 19.9% palmitic acid and 80.1% stearic acid, is melted and blended with a hot aqueous sugar solution so that the decaglycerol ester is thoroughly dispersed in the sugar solution. The sugar solution comprises 120 grams of water, 90 grams of sucrose, and 90 grams of dextrose. The blend is agitated and cooled to 100° F. The blend is then mixed with 4500 grams of powdered sugar (grade 6X) for about 5 minutes and then is further mixed with 5,000 grams of granular sugar (industrial fine) for another 15 minutes. This mixture is then milled on a small Alpine pin mill (type 160Z) with three passes. The ground mixture is then blended with 106 grams of gelatin, 310 grams of dextrose, 50 grams of salt, and 20 grams of vanilla to form a functional dry fluffy frosting mix.

A fluffy frosting is made by taking 121 grams of the above-described dry mix and mixing the dry mix with 80 grams of boiling water at high speed for 4 minutes. The fluffy frosting exhibits excellent air stability, excellent heat stability at 80° F., and good heat stability at 90° F.

When the above procedure is repeated using a ratio of polyglycerol ester-sugar solution mixture to dry sugar ratio of 1 to 9, substantially equivalent results are obtained.

What is claimed is:

1. A process for making dry prepared fluffy frosting mixes, which comprises the steps of:
    (a) blending melted polyglycerol esters with a hot concentraaed aqueous sugar solution in a ratio from about 1:1 to about 1:5; said aqueous sugar solution comprising from about 20% to about 50% water by weight of the total solution and said melted polyglycerol esters containing on the average from about 2 to about 12 glycerol units and averaging from about 2 to about 5 long chain, saturated fatty acid groups per molecule,
    (b) agitating and cooling said blend to below 120° F.,
    (c) grinding said cooled blend, and
    (d) mixing the cooled blend with dry sugar in a ratio of from about 1:5 to about 1:50.
2. The process of claim 1 containing the additional step (e) comprising adding to said mixture sugar, flavorings, thickeners, and salt.
3. The process of claim 1 wherein the sugar in the hot concentrated sugar solution of step (a) is selected from the group consisting of sucrose, dextrose, and mixtures of sucrose and dextrose.
4. The process of claim 3 wherein the ratio of melted polyglycerol esters to hot concentrated aqueous sugar solution in step (a) is from 1:2 to 1:4.
5. The process of claim 4 wherein the ratio of melted polyglycerol ester-sugar solution blend to dry sugar is from 1:7 to 1:11.
6. The process of claim 5 wherein the dry sugar of step (c) is a mixture of granular sugar and powdered sugar in a ratio from 2:1 to 1:2.
7. A dry fluffy frosting mix made according to the process of claim 1.
8. A process for producing a fluffy frosting which comprises adding hot water to the fluffy frosting mix of claim 1 and whipping.

References Cited
UNITED STATES PATENTS

| | | | |
|---|---|---|---|
| 3,230,090 | 1/1966 | Weiss | 99—139 X |
| 3,628,968 | 12/1971 | Noznick | 99—139 |
| 3,190,757 | 6/1965 | Underwood et al. | 99—139 |

RAYMOND N. JONES, Primary Examiner

J. M. HUNTER, Assistant Examiner